(12) United States Patent
Yamashita

(10) Patent No.: US 6,421,795 B2
(45) Date of Patent: Jul. 16, 2002

(54) INTEGRATED CIRCUIT DEVICE AND ITS CONTROL METHOD

(75) Inventor: Fumiaki Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/123,525

(22) Filed: Jul. 28, 1998

(30) Foreign Application Priority Data

Jul. 29, 1997 (JP) .............................................. 9-203403

(51) Int. Cl.$^7$ ................................................ G06F 11/34
(52) U.S. Cl. ............................ 714/45; 710/59; 710/60; 717/128
(58) Field of Search .............................. 714/45, 30, 31; 710/56, 57, 59, 60, 71; 703/28; 717/124, 127, 128

(56) References Cited

U.S. PATENT DOCUMENTS

| 4,238,834 | A | * | 12/1980 | Yates ........................ 364/900 |
| 4,833,655 | A | * | 5/1989 | Wolf et al. ................. 365/221 |
| 5,274,811 | A | * | 12/1993 | Borg et al. .................... 717/4 |
| 5,475,831 | A | * | 12/1995 | Yoshida et al. ............... 710/71 |
| 5,619,681 | A | * | 4/1997 | Benhamida et al. ......... 703/23 |
| 5,944,841 | A | * | 8/1999 | Christie ...................... 714/38 |
| 5,978,937 | A | * | 11/1999 | Miyamori et al. ............ 714/45 |
| 5,991,899 | A | * | 11/1999 | Deacon ....................... 714/37 |
| 6,018,809 | A | * | 1/2000 | Garrett ........................ 714/37 |
| 6,055,651 | A | * | 4/2000 | Sasaki et al. ................ 714/45 |
| 6,094,729 | A | * | 7/2000 | Mann .......................... 714/25 |
| 6,115,760 | A | * | 9/2000 | Lo et al. ...................... 710/52 |
| 6,148,381 | A | * | 11/2000 | Jotwani ...................... 711/158 |
| 6,154,857 | A | * | 11/2000 | Mann .......................... 714/30 |

FOREIGN PATENT DOCUMENTS

| DE | 35 13 834 A1 | 11/1985 |
| DE | 195 44 723 A1 | 6/1997 |
| JP | 9-45346 | 9/1928 |
| JP | 47-15050 | 8/1972 |
| JP | 53-26547 | 3/1978 |
| JP | 63-103103 | 7/1988 |
| JP | 64-29946 | 1/1989 |
| JP | 01-54547 AA | 3/1989 |
| JP | 64-54547 | 3/1989 |
| JP | 03-175541 AA | 7/1991 |
| JP | 4-294430 | 10/1992 |
| JP | 4-350737 | 12/1992 |

OTHER PUBLICATIONS

IBM Tech. Disc. Bull., "Warning of Trace Data Lost", vol. 28, iss. 10, p. 4436, Mar. 1986.*
Japanese Office Action dated Feb. 15, 2000 with partial translation.
Japanese Office Action, dated Jul. 11, 2000, with partial English translation.
English translation of a German Office Action dated Nov. 24, 1999 in the co-pending German application.

* cited by examiner

Primary Examiner—S Baderman
(74) Attorney, Agent, or Firm—McGinn & Gibb, PLLC

(57) ABSTRACT

An integrated circuit device sending trace data generated by a central processing unit (CPU) to a debug device without loss and a method of controlling the operation of the integrated circuit device. The integrated circuit device has the CPU executing various types of data processing. A trace buffer is connected via a parallel bus to a predetermined output terminal of the CPU. A buffer monitoring circuit is connected to an input terminal of the trace buffer and to a predetermined control terminal of the CPU. The CPU executes various types of data processing requested by a program and outputs trace data indicating an execution history. The trace buffer temporarily stores the trace data that is output in parallel by the CPU. When a usage amount of the trace buffer exceeds a preset threshold, the buffer monitoring circuit sends an interrupt signal BRKINT to the CPU to suspend the data processing of the CPU and, when a preset period of time elapses, releases the suspension of data processing of the CPU.

25 Claims, 2 Drawing Sheets

INTEGRATED CIRCUIT DEVICE AND ITS CONTROL METHOD

BACKGROUND OF THE INVENTION

1. Field of the Invention

The present invention relates to an integrated circuit device having at least a central processing unit and a trace buffer and to its operation control method.

2. Description of the Related Art

Conventionally, an integrated circuit device has been used in various types of data processing. This type of integrated circuit has a central processing unit, such as a Central Processing Unit (CPU) core, which reads a program for execution of data processing.

When this type of integrated circuit is in the process of development, it is necessary to test the internal operation. one of the methods for testing the internal operation is tracing the behavior of the central processing unit. When performing the trace, an external memory containing a user program is connected to the external bus of the integrated circuit device with a debug device, such as an In-Circuit Emulator (ICE) system, connected to the debug interface (I/F) of the integrated circuit.

To do the test, the user program is read into the central processing unit for execution of data processing, and trace data generated by the central processing unit during execution of data processing is collected by the debug device. Checking the collected trace data, which is the execution history data on the central processing unit, shows how the central processing unit performed data processing during execution of the user program.

Because trace data need not be output to an external device when the integrated circuit device described above is used in a production run, the trace data is output via the debug interface provided for debugging purposes only. In addition, this debug interface is structured most simply because it is not used during a production run. That is, the debug interface is usually structured as a single serial port through which trace data is output serially.

As described above, connecting the debug device to the conventional integrated circuit device allows trace data to be collected from the central processing unit which executes data processing requested by the user program. Collected trace data is then used in checking the behavior of the central processing unit.

However, since trace data is output serially from one serial port of the integrated circuit device, some trace data collected by the debug device may be lost if trace data is generated faster than it is sent serially to the debug device. This happens more frequently when the speed at which central processing unit outputs trace data is not constant. In this case, the speed at which trace data is output by the central processing unit tends to instantaneously exceed the maximum speed at which trace data is sent from the serial port to the debug device.

SUMMARY OF THE INVENTION

In view of the foregoing, it is an object of the present invention to provide an integrated circuit device sending trace data generated by a central processing unit to a debug device without loss and a method of controlling the operation of the integrated circuit device.

According to one aspect of the present invention, there is provided an integrated circuit device comprising a central processing unit executing data processing in response to an interrupt signal and outputting trace data during execution; a trace buffer temporarily storing the trace data; a serial port used to output the trace data to an external unit; and a buffer monitoring circuit causing to suspend the data processing according to the usage amount of the trace buffer, wherein the trace buffer comprises means for detecting the amount of trace data that is input in parallel; means for converting the trace data from parallel to serial; and a plurality of shift registers sequentially storing the trace data that has been converted to serial; and wherein the buffer monitoring circuit comprises means for calculating, based on the detected amount of trace data, the number of shift registers to be used; means for outputting an interrupt signal to the processor according to the calculated number of shift registers; means for outputting rotate instruction data according to the calculated number of shift registers; and means for generating a shift/load signal for the plurality of shift registers according to the calculated number of shift registers.

With this invention, the central processing unit outputs trace data serially to the serial port during data processing. Therefore, connecting a debug device to the serial port allows a user to collect trace data. In this case, because the trace data is temporarily stored in the trace buffer, it is output to the serial port at a constant speed even when the central processing unit outputs the trace data at a speed that is not constant. When the amount of temporarily-stored trace data exceeds a maximum allowable amount that is predetermined, the central processing unit suspends data processing, thus making it possible to collect all trace data output by the central processing unit. In addition, this simply-structure device is capable of calculating the approximate usage amount of the trace buffer without having to monitor the trace buffer usage. And, this integrated circuit device converts from parallel to serial the trace data entered into the trace buffer and then sequentially stores the converted data into the plurality of shift registers, allowing the trace data from the central processing unit to be stored in the trace buffer efficiently.

According to another aspect of the present invention, there is provided a method of controlling an integrated circuit device comprising a central processing unit for outputting trace data, a trace buffer for temporarily storing the trace data, and a serial port for outputting the trace data to an external unit, the method comprising the steps of executing data processing in accordance with a program and outputting the trace data indicating an execution history; temporarily storing the trace data according to a usage amount of the trace buffer; and outputting the trace data temporarily stored in the trace buffer to the external unit via the serial port.

With this invention, the central processing unit outputs trace data serially to the serial port during data processing. Therefore, connecting a debug device to the serial port allows a user to collect trace data. In this case, because the trace data is temporarily stored in the trace buffer, it is output to the serial port at a constant speed even when the central processing unit outputs the trace data at a speed that is not constant. When the amount of temporarily-stored trace data exceeds a maximum allowable amount that is predetermined, the central processing unit suspends data processing, thus making it possible to collect all trace data output by the central processing unit.

DESCRIPTION OF THE PREFERRED EMBODIMENTS

Figure 1:
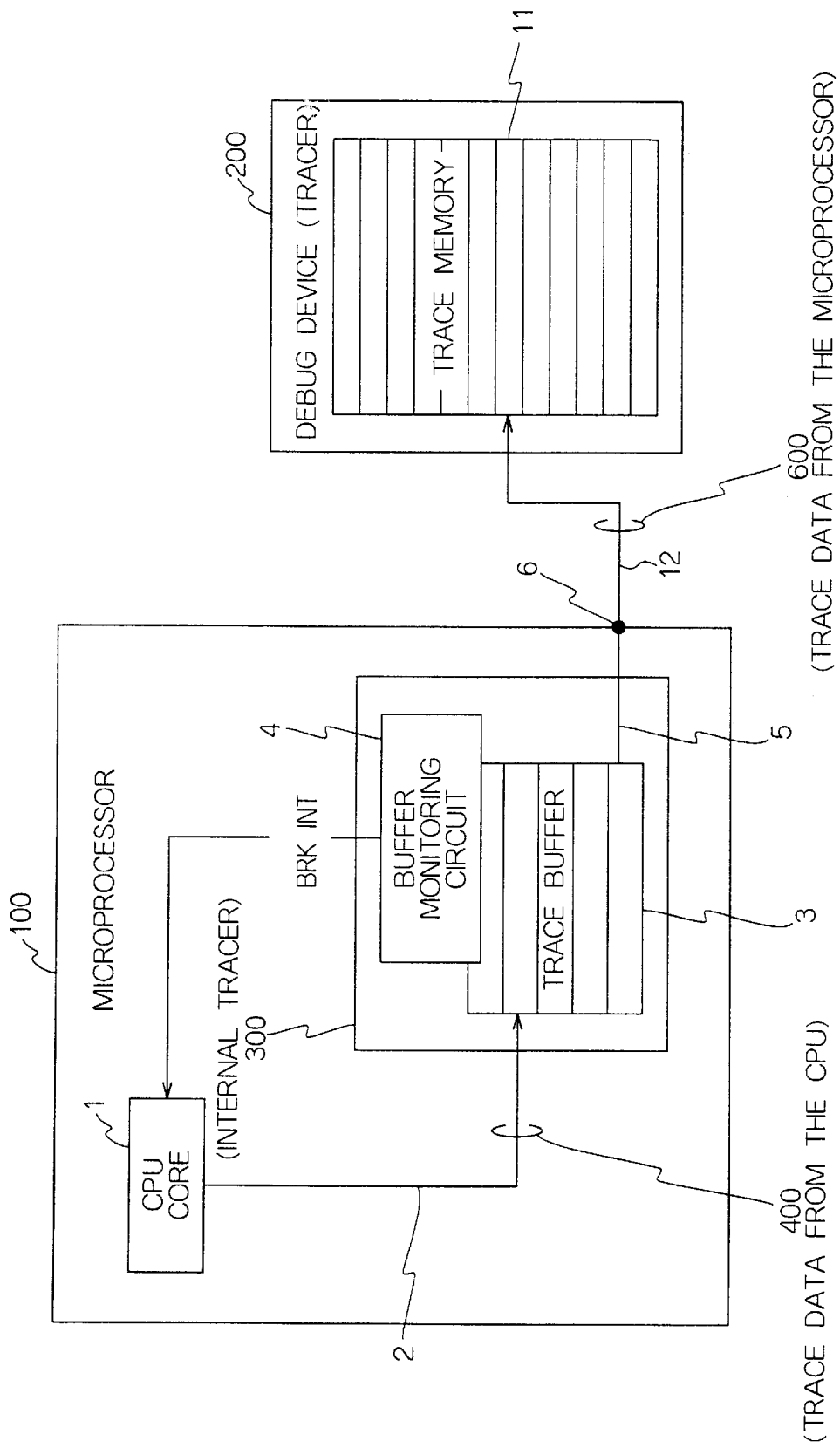
FIG. 1 is a block diagram depicting the configuration of a microprocessor, which is an integrated circuit device, and a debug device used in an embodiment of the present invention.
Figure 2:
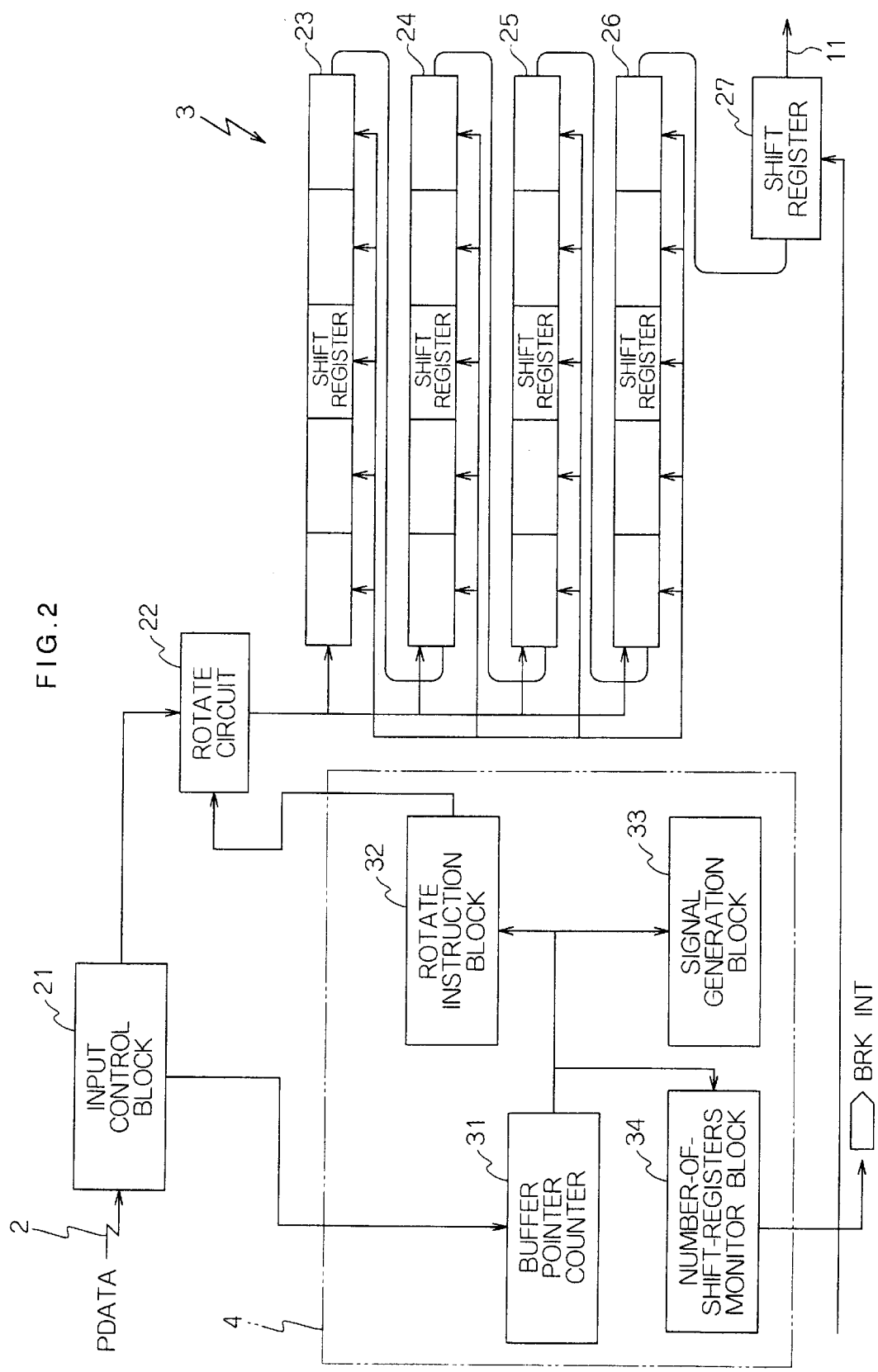
FIG. 2 is a block diagram depicting a trace buffer and a buffer monitoring circuit of the microprocessor.

Referring to FIGS. 1 and 2, the following describes an embodiment of the present invention. FIG. 1 is a block diagram depicting the internal structure of the integrated circuit device used in the embodiment, and FIG. 2 is a block diagram showing an internal tracer.

As shown in FIG. 1, a microprocessor 100 used as the integrated circuit device in this embodiment has a CPU core (processor) 1 which is the central processing unit executing various types of data processing. A trace buffer 3 is connected via a parallel bus 2 to a predetermined output terminal on this CPU core 1. A buffer monitoring circuit (trace controller) 4 is connected to an input terminal of the trace buffer 3 and to a predetermined control terminal of the CPU core 1.

The CPU core 1 executes various types of data processing requested by a program and outputs trace data indicating the execution history. The trace buffer 3 temporarily stores trace data that is output in parallel by the CPU core 1. When the usage amount of the trace buffer 3 exceeds a preset threshold, the buffer monitoring circuit 4 suspends the data processing of the CPU core 1 and, when a preset period of time elapses, releases the suspension of data processing of the CPU core 1.

A serial port 6, one of the connection terminals of the debug interface (not shown in the figure), is connected via a serial bus 5 to the output terminal of the trace buffer 3. And, a trace memory 11 of an independent and removable debug device 200 is connected to the serial port 6 via a serial connector 12.

Trace data temporarily stored in the trace buffer 3 is output serially via the serial port 6. The debug device 200 gets the trace data serially output from the microprocessor 100, and stores it in the trace memory 11.

As shown in FIG. 2, the trace buffer 3 comprises an input control block (detector) 21, a rotate circuit 22 which acts as a data conversion circuit, and a plurality of shift registers 23 to 27. The rotate circuit 22 is connected to the parallel bus 2 via the input control block 21, and the serially-connected shift registers 23–26 are connected to the rotate circuit 22. The last shift register 26 is connected to the serial bus 5 via a shift register 27.

The buffer monitoring circuit 4 comprises a buffer pointer counter (calculator) 31, a rotate instruction block 32, a signal generation block 33, and a number-of-shift-registers monitor block 34 (Blocks 32, 33, and 34 are collectively called a signal generator). The buffer pointer counter 31 is connected to the input control block 21. And, to the buffer pointer counter 31, the rotate instruction block 32, the signal generating block 33, and the number-of-shift-registers monitor block 34 are connected.

The rotate instruction block 32 is connected to the rotate circuit 22, the signal generation block 33 is connected to the shift registers 23–26, and the number-of-shift-registers monitor block 34 is connected to the control terminal on the CPU core 1.

The input control block 21 of the trace buffer 3 checks the amount of trace data that is received in parallel via the parallel bus 2. Then, based on the amount of trace data checked by the input control block 21, the buffer pointer counter 31 of the buffer monitoring circuit 4 calculates the number of shift registers 23–26 in the trace buffer 3 to be used for storing the trace data.

Based on the number of shift registers calculated by the buffer pointer counter 31 as described above, the rotate instruction block 32 sends a rotate instruction to the rotate circuit 22. Upon receiving the instruction, the rotate circuit 22 converts the trace data from parallel to serial. Also, based on the number of shift registers calculated above, the signal generation block 33 generates a shift/load signal for the shift registers 23–26. This signal causes the four serially-connected shift registers, 23–26, to sequentially store the serially-converted trace data.

Initially, the number-of-shift-registers monitor block 34 contains a preset number. For example, it contains 2. This number indicates the maximum allowable number of shift registers 23–26 which may be used for storing data. When the number of shift registers calculated as described above exceeds this maximum allowable number (2 in the above example), the number-of-shift-registers monitor block 34 sends to the CPU core 1 an interrupt signal BRKINT for debug to suspend the generation of debug data.

The number-of-shift-registers monitor block 34 has a clock mechanism such as an internal clock. When a preset time has elapsed from the time the interrupt signal BRKINT is generated, the number-of-shift-registers monitor block 34 stops sending the interrupt signal to allow the CPU core 1 to resume generating debug data.

In the configuration described above, a separate external memory (not shown in the figure) containing a user program is connected to the microprocessor 100 used in this embodiment. The CPU core 1 reads the user program from the external memory for execution of various types of data processing.

Then, connecting the serial connector 12 of the debug device 200 to the serial port 6 of the microprocessor 100 allows the debug device 200 to receive trace data generated by the CPU core 1 of the microprocessor 100 during data processing. The debug device 200 uses this trace data for checking the internal operation of the microprocessor 100.

And, the microprocessor 100 used in the embodiment temporarily stores trace data, generated by the CPU core 1 during data processing, into the trace buffer 3 before outputting it to an external device via the serial port 6. This makes it possible for trace data to be output from the serial port 6 at a constant speed even if the CPU core 1 outputs trace data speedily and irregularly, enabling the debug device 200 to receive trace data without loss.

In this embodiment, it should be noted that trace data output by the CPU core 1 is converted from parallel to serial before it is stored sequentially into the plurality of serially-connected registers, 23–26, in the trace buffer 3. This structure allows the trace buffer 3 to receive trace data without taking up much buffer space and to output trace data serially, preventing the circuit from getting large while still allowing much trace data to be stored temporarily. A trace buffer 3 with this structure is described in detail in Japanese Patent Laid-Open Publication No. A-9-45346.

In addition, when the usage amount of the trace buffer 3 in which trace data is temporarily stored exceeds a preset maximum allowable amount, the buffer monitoring circuit 4 tells the CPU core 1 to suspend data processing. This allows all trace data from the CPU core 1 to be temporarily stored in the trace buffer 3, enabling the debug device 200 to get trace data without loss.

Note that trace data temporarily stored in the trace buffer 3 is output to an external device at a constant speed via the serial port 6. Therefore, given the amount of trace data sent to the trace buffer 3, it is possible to calculate the usage amount of the trace buffer 3. In this embodiment, the monitoring circuit 4 of the microprocessor 100 calculates the usage amount of the trace buffer 3 from the amount of trace data sent from the CPU core 1 to the trace buffer 3. This simple structure makes it possible to calculate the approximate usage amount of the trace buffer 3, eliminating the need to actually monitor the usage amount of the trace buffer 3.

More specifically, the buffer monitoring circuit 4 calculates the number of shift registers in use to find the usage amount of the trace buffer 3. For example, if two shift registers are used when there are four, the buffer monitoring circuit 4 tells the CPU core 1 to suspend outputting trace data. This ensures that all trace data output from the CPU core 1 is stored temporarily in the trace buffer 3.

In addition, when a predetermined time has elapsed, the buffer monitoring circuit 4 allows the CPU core 1 to resume outputting trace data. That is, as trace data is output sequentially from the trace buffer 3 at a constant speed, the usage amount of the trace buffer 3 will be decreased, within the predetermined time, to a predetermined amount that is low enough to receive trace data temporarily.

This means that the simply-structured buffer monitoring circuit 4 allows the CPU core 1 to resume trace data generation at a right time according to the status of the trace buffer 3.

In the present invention, the buffer monitoring circuit 4 is implemented by logical circuits. The buffer monitoring circuit 4 may also be implemented by a program and a processor.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-203403 (Filed on Jul. 29th, 1997) including specification, claims, drawings and summary are incorporated herein by reference in its entirety.

What is claimed is:

1. A method of controlling an integrated circuit device comprising a central processing unit for outputting trace data, a trace buffer comprising a series arrangement of a plurality of shift registers for temporarily storing the trace data, and a serial port for outputting the trace data to an external unit, the method comprising:
   executing data processing in accordance with a program and outputting the trace data indicating an execution history;
   varying a size of the trace buffer according to a current amount of the trace data;
   temporarily storing the trace data in said trace buffer; and
   outputting the trace data temporarily stored in the trace buffer to the external unit via the serial port.

2. The method of controlling an integrated circuit device according to claim 1, further comprising:
   continuing data processing when the usage amount of the trace buffer does not exceed a maximum allowable amount.

3. The method of controlling an integrated circuit device according to claim 1, further comprising:
   suspending data processing when the usage amount of the trace buffer exceeds a maximum allowable amount.

4. The method of controlling an integrated circuit device according to claim 3, further comprising:
   releasing the suspension of data processing when a predetermined period of time has elapsed.

5. The method of controlling an integrated circuit device according to claim 4, wherein said predetermined period of time comprises a period of time required for said maximum allowable amount of trace data to be output from the serial port to the external unit.

6. An integrated circuit device outputting execution trace data during data processing, the integrated circuit device comprising:
   a processor executing data processing and outputting execution trace data;
   a trace buffer comprising a plurality of shift registers sequentially and temporarily storing the trace data, wherein a number of said plurality of shift registers is variable, based upon a detected amount of said execution trace data; and
   a port used to output the trace data temporarily stored in the trace buffer to an external unit.

7. The integrated circuit device according to claim 6, further comprising:
   a detector detecting an amount of trace data stored in the trace buffer; and
   a trace controller controlling the continuation and suspension of the processor according to the amount of detected trace data.

8. An integrated circuit device outputting execution trace data during data processing comprising:
   a processor executing data processing and outputting the execution trace data;
   a trace buffer comprising a plurality of shift registers sequentially storing the trace data;
   a serial port used to output the trace data temporarily stored in the trace buffer to an external unit; and
   a trace controller controlling the data processing of the processor and causing the integrated circuit device to:
      continue data processing when a usage amount of the trace buffer does not exceed a maximum allowable amount;
      suspend data processing when the usage amount of the trace buffer exceeds the maximum allowable amount; and
      release the suspension of data processing when a predetermined period of time has elapsed.

9. The integrated circuit device according to claim 8, wherein said predetermined period of time comprises a period of time required for said maximum allowable amount of trace data to be output from the serial port to the external unit.

10. An integrated circuit device outputting execution trace data during data processing, the integrated circuit device comprising:
   means for executing data processing and outputting execution trace data;
   means for storing the trace data sequentially and temporarily in a trace buffer comprising a series arrangement of a plurality of shift registers;
   means for interrupting said data processing when said trace data exceeds a preset threshold amount; and means for outputting the trace data temporarily stored in the trace buffer to an external unit.

11. An integrated circuit device outputting trace data during execution of data processing, the integrated circuit device comprising:
   a processor executing or suspending data processing in response to an interrupt signal and outputting parallel trace data;
   a rotate circuit converting the trace data from parallel to serial in response to rotate instruction data;
   a trace buffer comprising a plurality of shift registers and storing the trace data which has been converted to serial in response to a shift/load signal;
   a detector detecting an amount of the parallel trace data received for entry into the trace buffer; and
   a trace controller connected to the trace buffer and controlling the operation of the processor;
   wherein the trace controller comprises:
      a calculator calculating, based on the amount of detected trace data, a number of registers to be used for storing the trace data; and
      a signal generator generating the interrupt signal to be sent to the processor, the rotate instruction data to be sent to the rotate circuit, and the shift/load signal to be sent to the plurality of shift registers.

12. An integrated circuit device according to claim 11, wherein the trace controller allows the processor to continue data processing when a usage amount of the trace buffer does not exceed a maximum allowable amount.

13. An integrated circuit device according to claim 11, wherein the trace controller causes the processor to suspend data processing when a usage amount of the trace buffer exceeds a maximum allowable amount.

14. An integrated circuit device according to claim 13, wherein the trace controller releases the suspension of data processing when a predetermined period of time has elapsed.

15. An integrated circuit device comprising:
   a central processing unit executing data processing in response to an interrupt signal and outputting trace data during execution;
   a trace buffer temporarily storing the trace data;
   a serial port used to output the trace data to an external unit; and
   a buffering monitoring circuit causing the output of the trace data to be suspended according to a usage amount of the trace buffer,
   wherein the trace buffer comprises:
      means for detecting an amount of trace data that is input in parallel;
      means for converting the trace data from parallel data to serial data; and
      a plurality of shift registers sequentially storing the trace data that has been converted to serial; and
   wherein the buffer monitoring circuit comprises:
      means for calculating, based on the detected amount of trace data, a number of shift registers to be used;
      means for outputting an interrupt signal to the central processing unit according to the calculated number of shift registers;
      means for outputting rotate instruction data according to the calculated number of shift registers; and
      means for generating a shift/load signal for the plurality of shift registers according to the calculated number of shift registers.

16. The integrated circuit device according to claim 15, further comprising means for continuing data processing when the usage amount of the trace buffer does not exceed a maximum allowable amount.

17. The integrated circuit device according to claim 15, further comprising means for suspending data processing when the usage amount of the trace buffer exceeds a maximum allowable amount.

18. The integrated circuit device according to claim 17, further comprising means for releasing the suspension of data processing when a predetermined period of time has elapsed.

19. A computer program product stored on a storage medium for controlling an integrated circuit device comprising a processor executing data processing and outputting trace data; a trace buffer comprising a plurality of shift registers temporarily storing the trace data, and a serial port used to output the trace data to an external unit, wherein the program causes the integrated circuit device to:
   execute data processing in accordance with a user program and outputting the trace data indicating an execution history;
   vary a size of the trace buffer according to a current amount of the trace data;
   temporarily store the trace data; and
   output the trace data temporarily stored in the trace buffer to the external unit via the serial port.

20. The computer program product according to claim 19, wherein the computer program further causes the integrated circuit device to continue data processing when the usage amount of the trace buffer does not exceed a maximum allowable amount.

21. The computer program product according to claim 19, wherein the computer program further causes the integrated circuit device to suspend data processing when the usage amount of the trace buffer exceeds a maximum allowable amount.

22. The computer program product according to claim 21, wherein the computer program further causes the integrated circuit device to release the suspension of data processing when a predetermined period of time has elapsed.

23. An integrated circuit storing execution trace data from execution of a computer software program, said integrated circuit comprising:
   a trace buffer comprising a plurality of shift registers sequentially and temporarily storing said execution trace data, wherein a number of said plurality of shift registers used for said temporary storage is variable, based upon a detected amount of said execution trace data.

24. The integrated circuit of claim 23, further comprising a signal generator to generate an interrupt signal to interrupt said execution of said computer software program when an amount of said execution trace data temporarily stored in said trace buffer reaches a predetermined amount.

25. The integrated circuit of claim 24, wherein said execution trace data of said computer software program is output in a parallel format from a processor executing said computer software program, and said integrated circuit further comprises:
   a rotator to convert said parallel format into a serial format for storage in said trace buffer, wherein said detection of amount of said execution trace data comprises a determination of an amount of said parallel-formatted data.

* * * * *